US009866733B2

(12) United States Patent
Okamoto et al.

(10) Patent No.: US 9,866,733 B2
(45) Date of Patent: Jan. 9, 2018

(54) IN-VEHICLE DISPLAY DEVICE

(75) Inventors: Takamasa Okamoto, Kanagawa (JP);
Takashi Tokizaki, Kanagawa (JP);
Yasuhiko Uchida, Tokyo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 857 days.

(21) Appl. No.: 14/004,205

(22) PCT Filed: Mar. 12, 2012

(86) PCT No.: PCT/JP2012/001681
§ 371 (c)(1),
(2), (4) Date: Sep. 10, 2013

(87) PCT Pub. No.: WO2012/127809
PCT Pub. Date: Sep. 27, 2012

(65) Prior Publication Data
US 2014/0002743 A1 Jan. 2, 2014

(30) Foreign Application Priority Data

Mar. 23, 2011 (JP) .................................. 2011-063804

(51) Int. Cl.
H04N 5/14 (2006.01)
G01C 21/28 (2006.01)

(52) U.S. Cl.
CPC ............... H04N 5/14 (2013.01); G01C 21/28 (2013.01)

(58) Field of Classification Search
CPC .................................. G01C 21/28; H04N 5/14
(Continued)

(56) References Cited

U.S. PATENT DOCUMENTS

2004/0027258 A1* 2/2004 Pechatnikov .......... G01C 21/26
340/995.1
2007/0268146 A1* 11/2007 Itou ........................ G08B 21/06
340/576

(Continued)

FOREIGN PATENT DOCUMENTS

JP 2005-236969 A 9/2005
JP 2008-48051 A 2/2008
JP 2009-35024 A 2/2009

OTHER PUBLICATIONS

International Search Report for PCT/JP2012/001681, dated Jun. 12, 2012.

Primary Examiner — Anner N Holder
(74) Attorney, Agent, or Firm — RatnerPrestia

(57) ABSTRACT

An in-vehicle display device includes video input section into which a picture output from mobile terminal is input and display connected to video input section via video output controller and video output section. An output section of video input section is connected to an input section of image characteristics detector, an output section of image characteristics detector is connected to a first input section of image discriminator, an output section of vehicle operating state detector is connected to a second input section of image discriminator, and an output section of the image discriminator is connected to an input section of video output controller. Further, image discriminator compares an output from image characteristics detector with an output from vehicle operating state detector, and controls an output to video output controller.

5 Claims, 5 Drawing Sheets

(58) Field of Classification Search
USPC .......................................................... 348/148
See application file for complete search history.

(56) References Cited

U.S. PATENT DOCUMENTS

2008/0071474 A1* 3/2008 Harayama .......... G01C 21/3602
　　　　　　　　　　　　　　　　　　701/431
2011/0227843 A1* 9/2011 Wang .................... B60R 25/00
　　　　　　　　　　　　　　　　　　345/173

* cited by examiner

MOTION OF VEHICLE ← NORTHWEST

MOTION OF IMAGE → LOWER RIGHT

MOTION VECTOR OF TELEVISION

IN-VEHICLE DISPLAY DEVICE

TECHNICAL FIELD

The present invention relates to an in-vehicle display device capable of being connected to a communicable mobile terminal (for example, a mobile telephone and a portable multimedia terminal).

BACKGROUND ART

Conventional in-vehicle display devices such as car navigation devices and audio devices having in-vehicle displays are provided with large displays.

Therefore, for example, television broadcasting can be viewed by using the displays.

However, since it is not preferable from a viewpoint of safe driving to view television broadcasting while vehicles are running, a function for preventing television broadcasting from being displayed on the displays while the vehicles are running (hereinafter, running time display control function) is provided.

Further, in recent years, since mobile terminals such as mobile telephones and portable multimedia terminals have been developed, a lot of mobile terminals having various functions such as not only telephones and a moving image reproducing function but also a game and a car navigation function are commercialized.

Since such mobile terminals are generally miniaturized for portability, their display sections are also small and thus they are not easily viewed in a dimly lit environment such as an in-car environment.

Therefore, the mobile terminals are connected to the in-vehicle display devices, and games are played on the large displays.

Therefore, it is proposed that moving image inhibiting signals are transmitted from the in-vehicle display devices to the mobile terminals during the running of vehicles, and thus safety is secured (for example, Patent Literature 1).

In the conventional mobile terminal device proposed in Patent Literature 1, a moving image inhibiting signal is transmitted from the in-vehicle display device to the mobile terminal during the running of a vehicle.

Therefore, on the display of the in-vehicle display device, moving images are not reproduced, and thus safety can be secured.

However, also when a car navigation function of the mobile terminal is tried to be utilized, a map and a self vehicle position mark displayed on the display are moving images that move on the display, and thus the moving image inhibiting signal is transmitted from the in-vehicle display device to the mobile terminal.

That is to say, in the mobile terminal device proposed in Patent Literature 1, for example, the car navigation function of the mobile terminal cannot be utilized and thus the mobile terminal device is inconvenient.

Therefore, it is an object of the present invention to improve usability.

CITATION LIST

Patent Literature

PTL 1: Unexamined Japanese Patent Publication No. 2009-035024

SUMMARY OF THE INVENTION

In order to achieve the above object, the present invention includes a video input section into which a picture output from a mobile terminal is input, and a display connected to an output section of the video input section via a video output controller and a video output section. An input section of an image characteristics detector is connected to the video input section, an output section of the image characteristics detector is connected to a first input section of an image discriminator, an output section of a vehicle operating state detector is connected to a second input section of the image discriminator, and an output section of the image discriminator is connected to an input section of the video output controller. Further, the image discriminator compares an output from the image characteristics detector input from the first input section with an output from the vehicle operating state detector input from the second input section, so as to control the output to the video output controller.

DESCRIPTION OF EMBODIMENT

First Embodiment

An in-vehicle display device according to a first embodiment of the present invention is described below with reference to the drawings.

Figure 1:
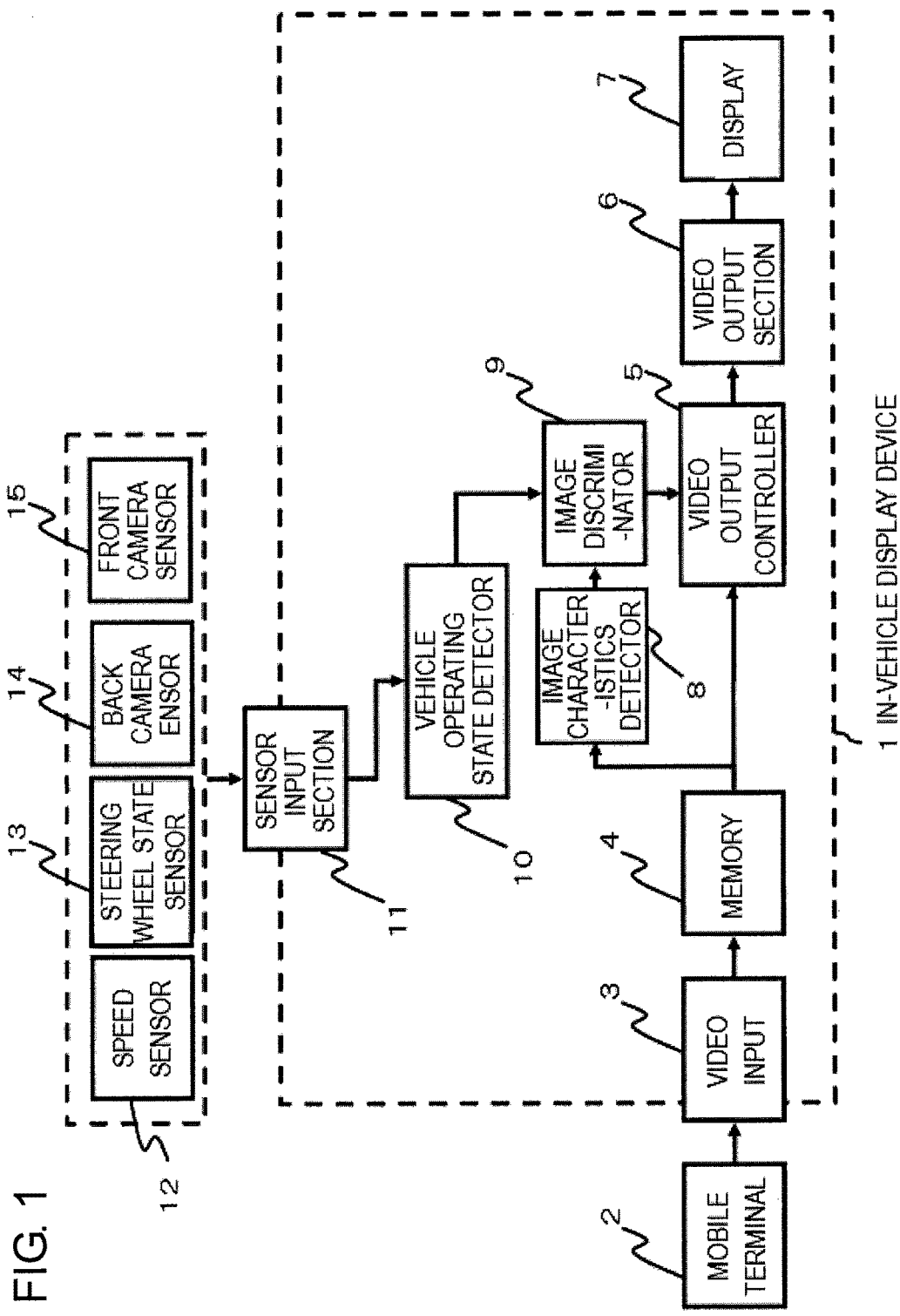
FIG. 1 is a control block diagram illustrating an in-vehicle display device according to a first embodiment of the present invention.

In-vehicle display device 1 shown in FIG. 1 is attached to a position on an anterior part in a vehicle where a driver can view the device.

In-vehicle display device 1 has video input section 3 into which a picture outputs from mobile terminal (for example, mobile telephone or portable multimedia terminal) 2 is input (simultaneously sounds are input).

Display 7 is connected to video input section 3 via memory 4, video output controller 5, and video output section 6 in series in this order.

An input section of memory 4 is connected to an output section of video input section 3, and an input section of image characteristics detector 8 is connected to an output section of memory 4.

An output section of image characteristics detector 8 is connected to a first input section of image discriminator 9, and an output section of vehicle operating state detector 10 is connected to a second input section of image discriminator 9.

Further, sensor input section 11 is connected to an input section of vehicle operating state detector 10.

A vehicle operating state is input into sensor input section 11 from various sensors provided to a vehicle control device (not shown) (for example, speed sensor 12, steering wheel state sensor 13, back camera sensor 14, and front camera sensor 15).

An output section of image discriminator 9 is connected to an input section of video output controller 5.

In-vehicle display device 1 shown in FIG. 1 has, for example, a music reproducing function and a video reproducing function, but since they are generally known components, they are not described in order to avoid complicated description. Naturally, the publicly-know music reproducing function and the video reproducing function of in-vehicle display device 1 enable videos to be displayed on display 7 and sounds to be output to a speaker (not shown), but a publicly-known running time display control function is performed on reproduction moving images, so that display 7 is brought into a non-display state while the vehicle is running.

As to a characteristic of the embodiment, video output controller 5 is constituted so that video on mobile terminal 2 are supplied to display 7 via video output section 6 in the following cases. That is to say, these cases include a case where an output from mobile terminal 2 is a still image, and a case where an operating state and operating direction information (vector information) of an image supplied from mobile terminal 2 are identified as being correlated with operating state information of the vehicle and advancing direction information (vector information) of the vehicle detected by vehicle operating state detector 10.

For example, when mobile terminal 2 is connected and a still image (for example, photograph) is sent from mobile terminal 2 or when a car navigation function of mobile terminal 2 is tried to be utilize, the still image or map information of the car navigation function is displayed on display 7.

That is to say, when the photograph has trouble being seen on mobile terminal 2 having only a small display section in a dark vehicle and the car navigation function is tried to be utilized, the map has trouble being seen on the small display section of mobile terminal 2. Therefore, when the photograph or the map is displayed on display 7 larger than the small display section of mobile terminal 2, usability is improved.

On the contrary, when the output from mobile terminal 2 is a television picture or a game picture, they are not correlated with the operating state information of the vehicle and the advancing direction information (vector information) of the vehicle, and thus they are prevented from being displayed on display 7.

That is to say, the running time display control function for preventing a moving image (for example, television picture or game picture) that hinders the vehicle driving from being displayed on display 7 is performed.

This operating state is described below based on FIGS. 1 and 2.

Figure 2:
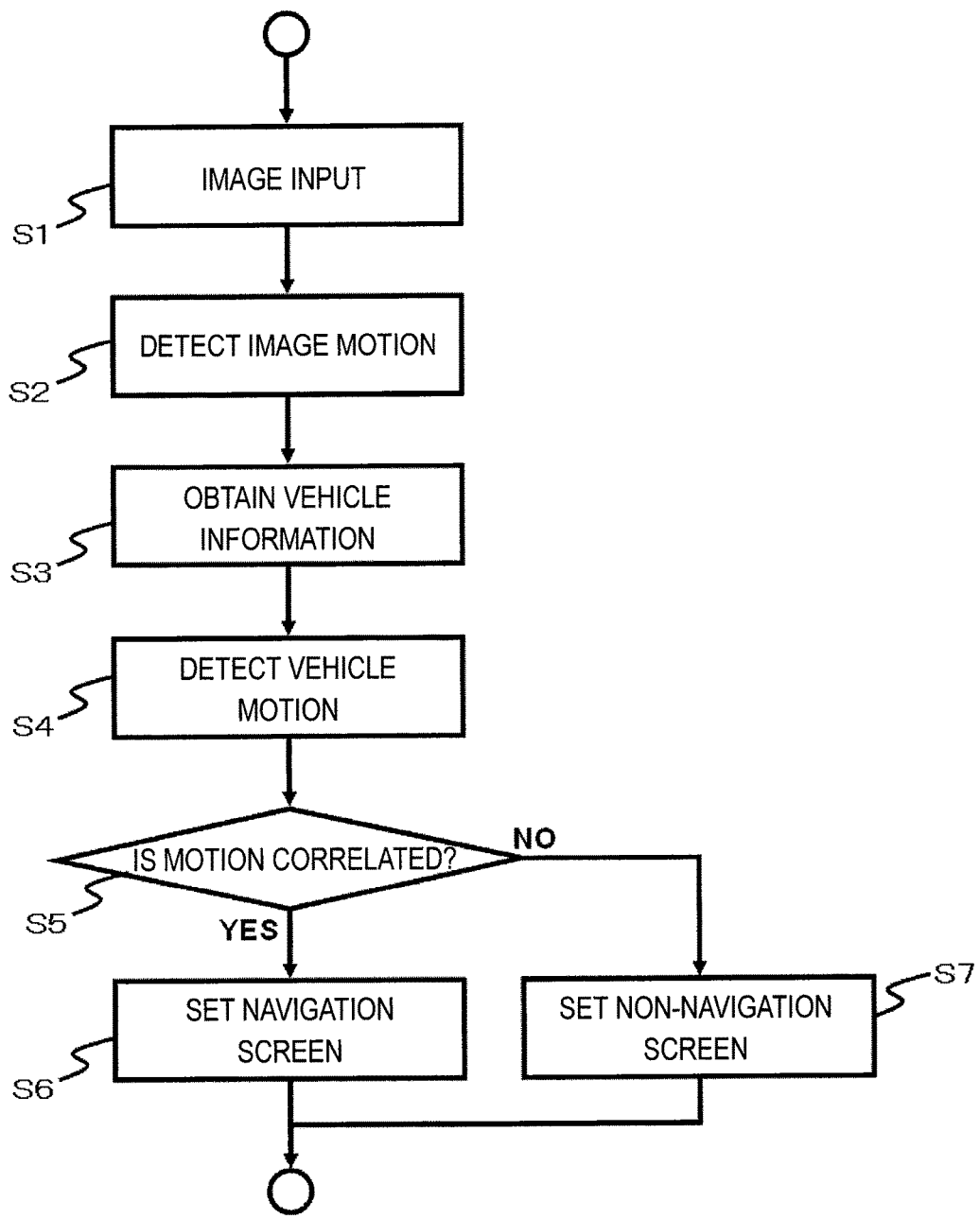
FIG. 2 is an operation flowchart illustrating the in-vehicle display device according to the first embodiment of the present invention.

When mobile terminal 2 is connected to video input section 3 in the vehicle (wireless connection or communication connection), this connected state is detected by, for example, a switch (not shown), and the respective sections of in-vehicle display device 1 starts to operate (S1 in FIG. 2). In the S1 state, since a determination is not made whether the running time display control function is performed on an image transmitted from mobile terminal 2, the image is not displayed on display 7.

At this time, the car navigation function (excluding the running time display control function) of mobile terminal 2 is tried to be utilized, and pictures at that time (map picture and guidance picture) are displayed on display 7 via memory 4, video output controller 5, and video output section 6.

In this embodiment, destination is set on a display section of mobile terminal 2, but the destination may be set by utilizing display on display 7. In this case, a touch switch (not shown) is provided to display 7, and the destination input should be supplied from in-vehicle display device 1 to mobile terminal 2.

A picture supplied from mobile terminal 2 to video input section 3 (map picture or guidance picture) is updated and recorded for every one picture in memory 4.

Therefore, image characteristics detector 8 detects characteristics of the images updated for every one image in memory 4 as described above.

Figure 3:
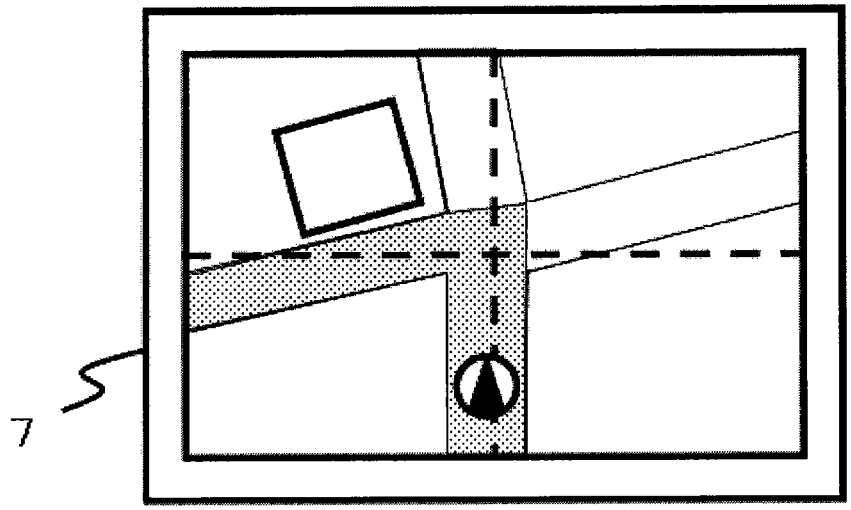
FIG. 3 is a diagram describing an operation of the in-vehicle display device according to the first embodiment of the present invention.
Figure 4:
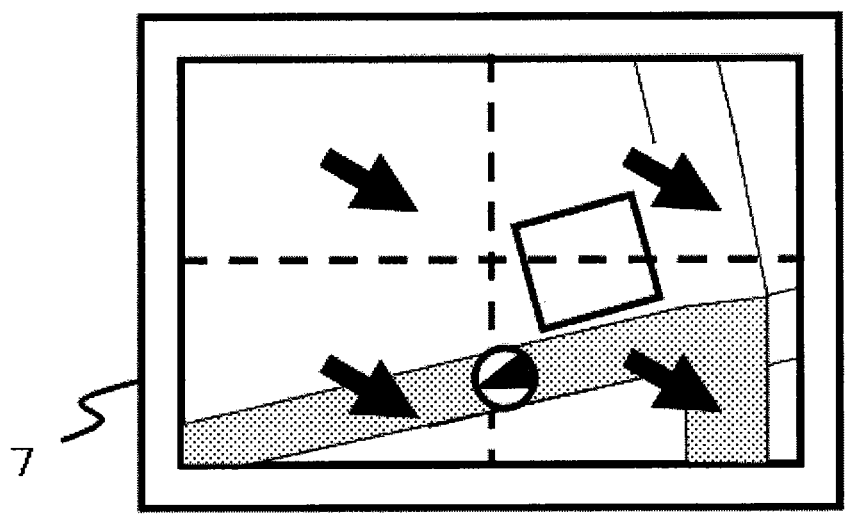
FIG. 4 is a diagram describing an operation of the in-vehicle display device according to the first embodiment of the present invention.

This state is shown in FIGS. 3 and 4.

The determination is made by image discriminator 9, described later, that the running time display control function is not performed on the image on display 7 in FIGS. 3 and 4, and the image is displayed. However, in order to enhance understanding of the operation of image characteristics detector 8, the displays on display 7 shown in FIGS. 3 and 4 are used.

FIG. 3 illustrates a state that map picture and guidance picture are displayed on display 7 when the car navigation function (excluding the running time display control function) is utilized in a stabilized display state.

In FIG. 3, a tinted route is a guidance route to destination and a triangular arrow indicates a self vehicle position. Therefore, this vehicle eventually turns left, and veers off to left as shown in FIG. 4.

In such a case, the image on display 7 in the state of FIG. 3 moves from upper-left to lower-right as shown in FIG. 4.

The arrow on display 7 in FIG. 4 is the operating direction information (vector information) of the image, and when the picture moves from FIG. 3 to FIG. 4, image characteristics detector 8 detects that the image on display 7 moves (transfers) as characteristic information (S2 in FIG. 2).

Vehicle operating state detector 10 obtains vehicle information and detects an operation of the vehicle (S3 and S4 in FIG. 2).

That is to say, since the operating state of the vehicle is input from speed sensor 12, steering wheel state sensor 13, back camera sensor 14 and front camera sensor 15 via sensor input section 11 to vehicle operating state detector 10, vehicle operating state detector 10 can detect how the vehicle operates.

Since the vehicle moves to left as shown in FIG. 4, vehicle operating state detector 10 detects the operating state information (transfer state) of the vehicle and the advancing direction information (vector information) of the vehicle.

The output section of image characteristics detector 8 is connected to the first input section of image discriminator 9, and the output section of vehicle operating state detector 10 is connected to the second input section of image discriminator 9.

For this reason, image discriminator 9 discriminates a moving state of the image in memory 4 (the image displayed on display 7 is similar) and the operating direction information (vector information) as being similar to the operating state information of the vehicle and the advancing direction information (vector information) of the vehicle (correlated) detected by vehicle operating state detector 10. Video output controller 5 is instructed to continuously supply the picture of memory 4 to display 7 via video output section 6 (S5 and S6 in FIG. 2). As a result, the pictures in FIGS. 3 and 4 are displayed on display 7.

Figure 7:
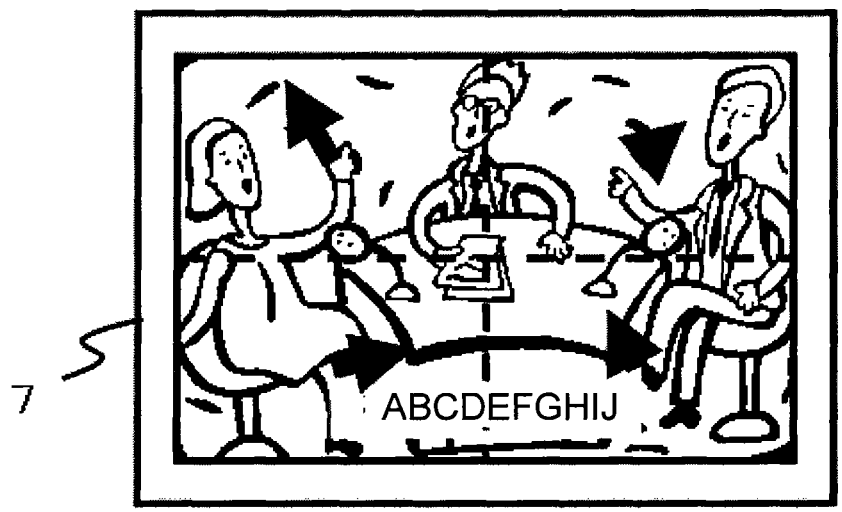
FIG. 7 is a diagram describing an operation of the in-vehicle display device according to the first embodiment of the present invention.

On the contrary, when an output from mobile terminal 2 is a television picture or a game picture, as shown in FIG. 7, it is not correlated with the operating state information of the vehicle and the advancing direction information (vector information) of the vehicle. For this reason, the output is prevented from being displayed on display 7 (the running time display control function is performed) (S5 and S7 in FIG. 2).

That is to say, as understood from the comparison between FIG. 4 and FIG. 7, since the operating state and the operating direction information (vector information) of the entire image (the image displayed on display 7 is similar) are not correlated with the advancing direction information (vector information) of the vehicle, they are prevented from being displayed on display 7 (the running time display control function is performed).

In this embodiment, in order to heighten performing reliability of the running time display control function in a case where such output from mobile terminal 2 is carried out, image characteristics detector 8 supplies the operating states and the operating direction information (vector information) of images obtained by dividing the image in memory 4 (also in display 7) to the first input section of image discriminator 9.

Concretely, image characteristics detector 8 divides the image in memory 4 (also in display 7) into four vertically and horizontally as shown in FIGS. 3 and 4, and supplies the operating states and the operating direction information (vector information) of the divided images to the first input section of image discriminator 9.

This is for coping with a case where the output from mobile terminal 2 is special, and the special example is "car driving game".

In this "car driving game", incidentally a moving state of a car in the game and operating information of map information around the car are approximately the same as the operating state information of the vehicle (moving state) and the advancing direction information (vector information) of the vehicle detected by vehicle operating state detector 10.

In this embodiment, therefore, image characteristics detector 8 divides the image in memory 4 (also in display 7) into four vertically and horizontally as shown in FIGS. 3 and 4, and supplies the operating states and the operating direction information (vector information) of the divided images to the first input section of image discriminator 9.

As a result, the operating states and the operating direction information (vector information) of the images obtained by dividing the image in memory 4 (also in display 7 into four vertically and horizontally can be compared with the operating state information (moving state) of the vehicle and the advancing direction information of the vehicle (vector information) in image discriminator 9.

As a result, even in a very similar state on entire display 7, the operating states and the operating direction information (vector information) of the divided images are different from the operating state information (moving state) of the vehicle and the advancing direction information (vector information) of the vehicle detected by vehicle operating state detector 10. In this case, "the car driving game" can be prevented from being displayed on display 7 (the running time display control function is performed).

In this embodiment, the operating state and the operating direction information (vector information) of the image in memory 4 are compared with the operating state information of the vehicle (moving state) and the advancing direction information (vector information) of the vehicle in image discriminator 9, so that random repetition of the display on display 7 between display non-display can be prevented.

That is to say, the operating state and the operating direction information (vector information) of an image displayed on display 7 are once compared with the operating state information (moving state) of the vehicle and the advancing direction information (vector information) of the vehicle detected by vehicle operating state detector 10. In such a manner, some display contents are displayed on display 7, and nothing is displayed at next time. As a result, display on display 7 is frequently changed (random display), and thus usability is extremely unsatisfactory.

On the contrary, like this embodiment, when the operating state and the operating direction information (vector information) of the image in memory 4 are compared with the operating state information (moving state) of the vehicle and the advancing direction information (vector information) of the vehicle in image discriminator 9, a type of the image currently supplied from mobile terminal 2 can be determined in advance.

According to this determination, when the type of the image supplied from mobile terminal 2 is the car navigation function or a photograph (excluding the running time display control function), the image is continuously displayed on display 7.

On the contrary, when the type of the image supplied from mobile terminal 2 is a television picture or a game picture (the running time display control function is performed), the image can be prevented from being displayed on display 7 from the beginning.

That is to say, the random display on display 7 between the display and non-display states can be prevented, and thus the usability is improved.

Figure 5:
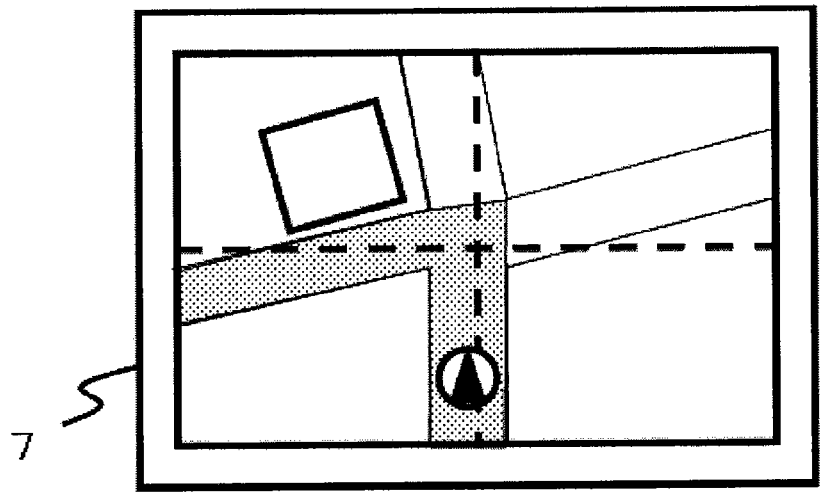
FIG. 5 is a diagram describing an operation of the in-vehicle display device according to the first embodiment of the present invention.
Figure 6:
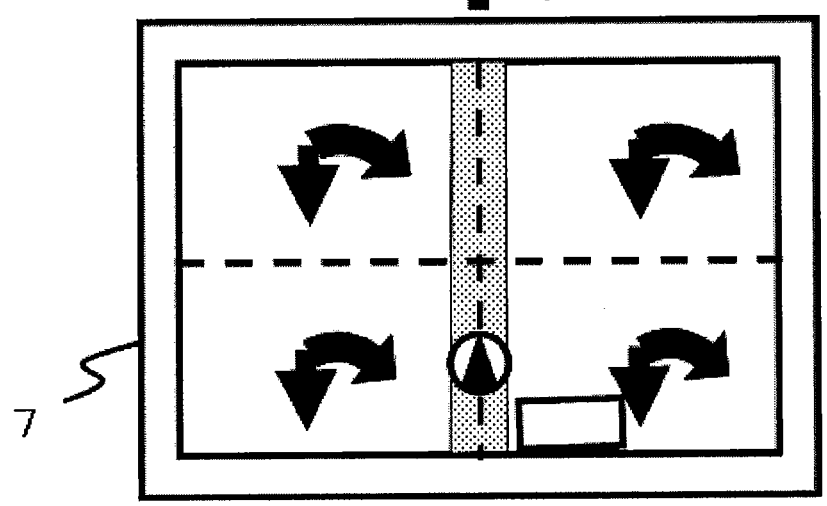
FIG. 6 is a diagram illustrating an operation of the in-vehicle display device according to the first embodiment of the present invention.

FIGS. 5 and 6 illustrate a state that a map picture and a guidance picture are displayed on display 7 in a heading up state.

In FIG. 5, a tinted route is a guidance route to destination and a triangular arrow indicates a self vehicle position. Therefore, the vehicle soon veers off to left in FIG. 5, but in the heading up state, the direction of the self vehicle is not changed as shown in FIG. 6, and the image (map) on display 7 in the state of FIG. 5 is rotated to down or right as indicated by the arrow as shown in FIG. 6.

The arrow on display 7 in FIG. 6 is the operating direction information (vector information) of the image, and when the picture moves as shown in FIG. 5 and FIG. 6, image characteristics detector 8 detects movement (transfer) of that the image on display 7 as characteristic information.

Therefore, image discriminator 9 compares the characteristic information detected by image characteristics detector 8 with the operating information of the vehicle detected by vehicle operating state detector 10.

The present invention has the video input section into which a picture output from the mobile terminal is input, and the display that is connected to the video input section via the video output controller and the video output section. The output section of the video input section is connected to the input section of the image characteristics detector, the output section of the image characteristics detector is connected to the first input section of the image discriminator, the output section of the vehicle operating state detector is connected to the second input section of the image discriminator, and the output section of the image discriminator is connected to the input section of the video output controller. Further, the image discriminator compares an output from the image characteristics detector input from the first input section with an output from the vehicle operating state detector input from the second input section so that the output to the video output controller is controlled. For this reason, the usability is extremely satisfactory.

That is to say, in the present invention, since the output section of the video input section is connected to the input section of the image characteristics detector, the characteristics of the image transmitted from the mobile terminal, such as whether the image is a still image or a moving image and a type of the moving image, can be detected.

When the detected image is a moving image and the image can be identified in the image discriminator as being correlated with the operating state of the vehicle, such as operating/non-operating information, and the advancing direction information (vector information) of the vehicle detected by the vehicle operating state detector, the video output controller is constituted so as to supply the moving image to the display via the video output section.

When the car navigation function of the mobile terminal is utilized, the characteristics of the image detected by the image characteristics detector are correlated with the operating state of the vehicle, and thus even a navigation image as a moving image can be shown on the display. That is to say, since the car navigation function can be utilized, the usability is good.

INDUSTRIAL APPLICABILITY

When the in-vehicle display device of the present invention is utilized as an in-vehicle display or an audio with display, the display device can exercise the suitable running time display control function even in a state that the mobile terminal is connected, and also, for example, the car navigation function can be still utilized, thereby showing enormous usefulness.

REFERENCE MARKS IN THE DRAWINGS 1 in-vehicle display device
2 mobile terminal
3 video input section
4 memory
5 video output controller
6 video output section
7 display
8 image characteristics detector
9 image discriminator
10 vehicle operating state detector
11 sensor input section
12 speed sensor
13 steering wheel state sensor
14 back camera sensor
15 front camera sensor

The invention claimed is:
1. An in-vehicle display device comprising:
a video input section into which visual data from a mobile terminal is input; and
a display connected to the video input section via a video output controller and a video output section, wherein
the video output controller outputs the visual data to the display via the video output section when an operating state of the visual data is identified as being correlated with an operating state of a vehicle in which the in-vehicle display device is mounted and when operating direction information of the visual data is opposite to vehicle advancing direction information of the vehicle in which the in-vehicle display device is mounted.
2. The in-vehicle display device according to claim 1, wherein the video output controller outputs the visual data to the display when an operating state of the visual data is identified as being correlated with the operating state of a vehicle in which the in-vehicle display device is mounted and when the operating direction information of the visual data is opposite to the vehicle advancing direction information of the vehicle in which the in-vehicle display device is mounted.
3. The in-vehicle display device according to claim 1, wherein the video output controller outputs the visual data to the display when operating states and the operating direction information of divided four parts of an image, obtained by dividing an image from the visual data into four vertically and horizontally, are identified as being correlated with the operating state and the advancing direction information of the vehicle.
4. A display method comprising:
inputting visual data from a mobile terminal; and
outputting the visual data to a display when an operating state of the visual data is identified as being correlated with an operating state of a vehicle in which the in-vehicle display device is mounted and when operating direction information of the visual data is opposite to the vehicle advancing direction information of the vehicle in which the in-vehicle display device is mounted.
5. A non-transitory computer readable memory medium in an in-vehicle display device comprising:
inputting visual data from a mobile terminal; and
outputting the visual data to a display when an operating state of the visual data is identified as being correlated with an operating state of a vehicle in which the in-vehicle display device is mounted and when operating direction information of the visual data is opposite to vehicle advancing direction information of the vehicle in which the in-vehicle display device is mounted.

* * * * *